US009529993B2

(12) United States Patent
Kapadia et al.

(10) Patent No.: US 9,529,993 B2
(45) Date of Patent: Dec. 27, 2016

(54) POLICY-DRIVEN APPROACH TO MANAGING PRIVILEGED/SHARED IDENTITY IN AN ENTERPRISE

(75) Inventors: Kaushal Kiran Kapadia, Ashok Nagar (IN); Gaurav Gupta, Jaipur (IN); Rohit Jaiswal, Bangalore (IN); Gaurang Sudhakar Tapase, Pune (IN); Sachin Sanjay Gujar, Amravati (IN)

(73) Assignee: International Business Machines Corporation, Armonk, NY (US)

( * ) Notice: Subject to any disclaimer, the term of this patent is extended or adjusted under 35 U.S.C. 154(b) by 101 days.

(21) Appl. No.: 13/411,112

(22) Filed: Mar. 2, 2012

(65) Prior Publication Data
US 2013/0232541 A1  Sep. 5, 2013

(51) Int. Cl.
*G06F 21/30* (2013.01)
*G06F 21/40* (2013.01)
*G06F 21/33* (2013.01)
*H04L 29/06* (2006.01)

(52) U.S. Cl.
CPC .............. *G06F 21/40* (2013.01); *G06F 21/33* (2013.01); *H04L 63/102* (2013.01); *G06F 2221/2143* (2013.01); *H04L 2463/082* (2013.01)

(58) Field of Classification Search
CPC .............. H04L 63/102; H04L 2163/082; G06F 2221/2143
USPC ..................................... 726/1, 2, 8
See application file for complete search history.

(56) References Cited

U.S. PATENT DOCUMENTS

| 7,376,838 | B2 | 5/2008 | Narayanan |
| 7,562,226 | B2 | 7/2009 | Aiken et al. |
| 7,900,252 | B2 | 3/2011 | Kawano et al. |
| 8,271,785 | B1* | 9/2012 | Danoyan et al. ............. 713/167 |
| 2005/0015628 | A1* | 1/2005 | Narayanan .................... 713/202 |
| 2008/0034411 | A1* | 2/2008 | Aoyama ........................... 726/5 |
| 2008/0276308 | A1* | 11/2008 | Graser .................... G06F 21/31 726/6 |
| 2010/0122326 | A1* | 5/2010 | Bisbee et al. ..................... 726/5 |
| 2010/0325705 | A1* | 12/2010 | Iverson et al. ................... 726/6 |
| 2011/0023107 | A1 | 1/2011 | Chen et al. |

(Continued)

OTHER PUBLICATIONS

Buecker et al, "Centrally Managing and Auditing Privileged User Identities by Using the IBM Integration Services for Privileged Identity Management," 2010.

(Continued)

*Primary Examiner* — Ellen Tran
(74) *Attorney, Agent, or Firm* — Gail H. Zarick; David H. Judson

(57) ABSTRACT

Access to a privileged account is managed by first requiring authentication of a user logging into the account and then performing a policy evaluation to determine whether the identified user is allowed to log in using the privileged identity. Preferably, the authentication is a two factor authentication. The policy evaluation preferably enforces a policy, such as a role-based access control, and a context-based access control, a combination of such access controls, or the like. Thus, according to this approach, the entity is provided access to the privileged account if the user's identity is verified and a policy is met. In the alternative, the entity is denied access to the privileged account if either the authentication fails, or (assuming authentication does not fail) policy criteria for the user is not met.

23 Claims, 5 Drawing Sheets

(56) References Cited

U.S. PATENT DOCUMENTS

2011/0296001 A1* 12/2011 Ramstrom .................. 709/224

OTHER PUBLICATIONS

"Securing Privileged Accounts with Hitachi ID Privileged Access Manager," Jul. 2011.
Purohit et al, "Tracing the Root of 'Rootable' Processes," Proceedings, Annual Computer Security Applications Conference, ACSAC, Dec. 1, 2004.
Mavridis et al, "Access Control Based on Attribute Certificates for Medical Intranet Applications," Journal of Medical Internet Research, vol. 3, No. 1, Jan.-Mar. 2001.
"In Focus: Controlling Privileged Accounts," FoxT Solution, 2006.

* cited by examiner

US 9,529,993 B2

POLICY-DRIVEN APPROACH TO MANAGING PRIVILEGED/SHARED IDENTITY IN AN ENTERPRISE

BACKGROUND OF THE INVENTION

Technical Field

This disclosure relates generally to security within an enterprise computing environment and, in particular, to a policy-based approach to control whether users are permitted access to privileged accounts associated with the enterprise resources.

Background of the Related Art

Every organization that deploys an IT infrastructure has a requirement for privileged users. These privileged users, including system accounts, administrators, managers, and business executives, are typically granted administrative or special rights to manage business-critical resources, such as operating systems, databases, ERP systems, and many other applications, systems, and platforms. A "privileged identity" (or ID) refers to any type of user or account that holds special or extra permissions with respect to a particular resource. A typical example is root on a Unix®-based system, Administrator on a Windows®-based system, dbadmin on a DB2®-based system, and so forth. These types of non-personal accounts may exist on or be associated with virtually any type of enterprise resource. The privileged IDs, which are usually shared among a pool of users, can cause accountability and compliance issues, and they can increase the risk for sabotage and data theft. The trends towards data center consolidation, cloud computing, and virtualization in today's IT infrastructures can create an even greater number of privileged IDs, thereby exacerbating these security concerns. Increased outsourcing trends, where resources are used all over the world with historically high turn-over rates of employees, create an even greater need to centrally manage and secure privileged IDs.

A typical strategy to secure a privileged account identity is to periodically scramble the account password, store current passwords securely, and control disclosure of the current password. This type of approach, however, has several difficulties including, without limitation, increased computational overhead (due to the requirement to scramble the password periodically), a requirement that only one user at a time may login using the privileged identity, the inability to consider a particular context associated with the access request, an inability to distinguish/identify whether the entity accessing the account is a person or some automatic/programmatic entity, and an inability to track and audit accurately which user has logged into a particular privileged account.

It is known in the prior art to provide products and services that can help enable an organization to centrally manage and audit a pool of privileged user IDs, which can be checked in and checked out by authorized people when needed. One such commercial offering is the IBM® Integration Services for Privileged Identity Management (also known as IBM Privileged Identity Management solution), which enables privileged user IDs to be checked in and checked out by authorized people when needed. This solution also can be integrated with other identity management and enterprise single sign-on (ESSO) solutions to simplify the user experience. Using these tools, users do not have to manually enter the password associated with the privileged account, which can help keep the organization's privileged user IDs more secure.

While systems of this type provide advantages, they do not address the problems identified above.

BRIEF SUMMARY

According to this disclosure, access to a privileged account is managed by requiring authentication of a user logging into the account and performing a policy evaluation to determine whether the user (if authenticated) is allowed to log in using the privileged identity.

The method begins by determining that an entity (e.g., a user, an application associated with the user, or the like) is attempting to logon to a privileged account associated with a resource. The privileged account has an account credential associated therewith. Typically, the privileged account credential consists of an account name (e.g., root) and a password adapted to be shared among a set of entities. If the entity is attempting to logon to the privileged account, the entity is prompted to provide additional identifying information. Preferably, the prompting operation facilitates a two-factor authentication, wherein the additional identifying information typically is a user identifier and password pair uniquely associated with the entity. If the user identifier and password pair can then be verified, an additional check is then performed, preferably in the form of a policy evaluation. The policy check enforces a policy of a set of policies, where typically the policy is any generic access control policy such as one of: a role-based access control, and a context-based access control, a combination of such access controls, or the like. If the policy check passes, the entity is authorized to login to the privileged account. Thus, according to this approach, the entity is provided access to the privileged account if the user's identity is verified and a policy is met. In the alternative, the entity is denied access to the privileged account if, based on the additional identifying information received following the prompt or information in the policy, the entity is not authorized to login to the privileged account.

In an alternative embodiment, the above-described method is performed in an apparatus.

In another alternative embodiment, the above-described method is performed by a computer program product in a computer readable medium for use in a data processing system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
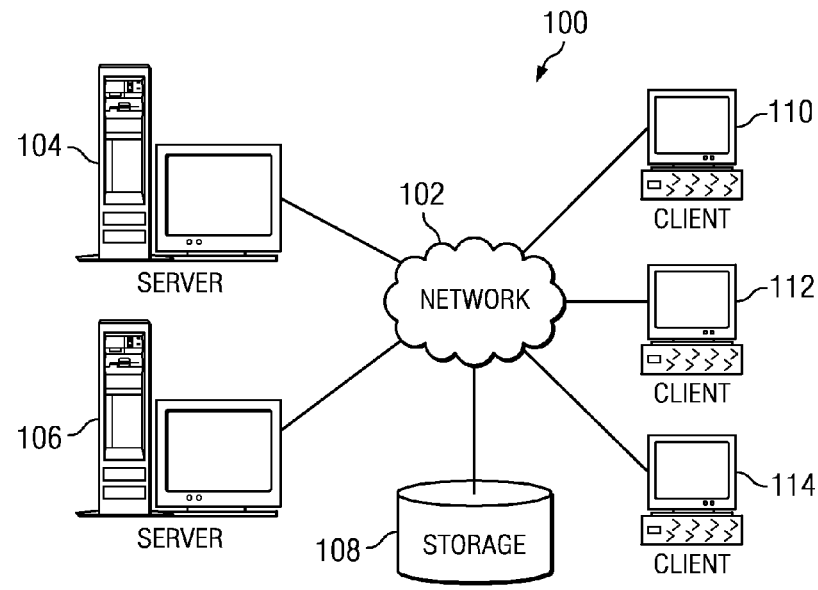
FIG. 1 depicts an exemplary block diagram of a distributed data processing environment in which exemplary aspects of the illustrative embodiments may be implemented.
Figure 2:
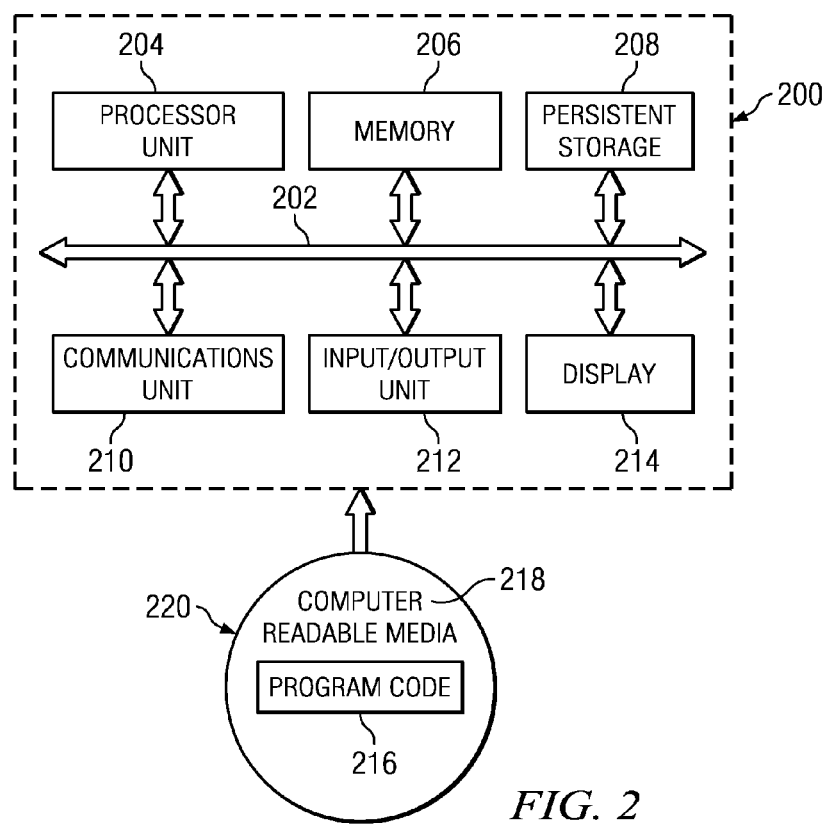
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

As is well-known, and by way of additional background, authentication is the process of validating a set of credentials that are provided by a user or on behalf of a user. Authentication is accomplished by verifying something that a user knows, something that a user has, or something that the user is, i.e. some physical characteristic about the user. Something that a user knows may include a shared secret, such as a user's password, or by verifying something that is known only to a particular user, such as a user's cryptographic key. Something that a user has may include a smartcard or hardware token. Some physical characteristic about the user might include a biometric input, such as a fingerprint or a retinal map. It should be noted that a user is typically, but not necessarily, a natural person; a user could be a machine, computing device, or other type of data processing system that uses a computational resource. It should also be noted that a user typically but not necessarily possesses a single unique identifier; in some scenarios, multiple unique identifiers may be associated with a single user.

An authentication credential is a set of challenge/response information that is used in various authentication protocols. For example, a username and password combination is the most familiar form of authentication credentials. Other forms of authentication credential may include various forms of challenge/response information, Public Key Infrastructure (PKI) certificates, smartcards, biometrics, and so forth. Typically, an authentication is presented by a user as part of an authentication protocol sequence with an authentication server or service.

Figure 3:
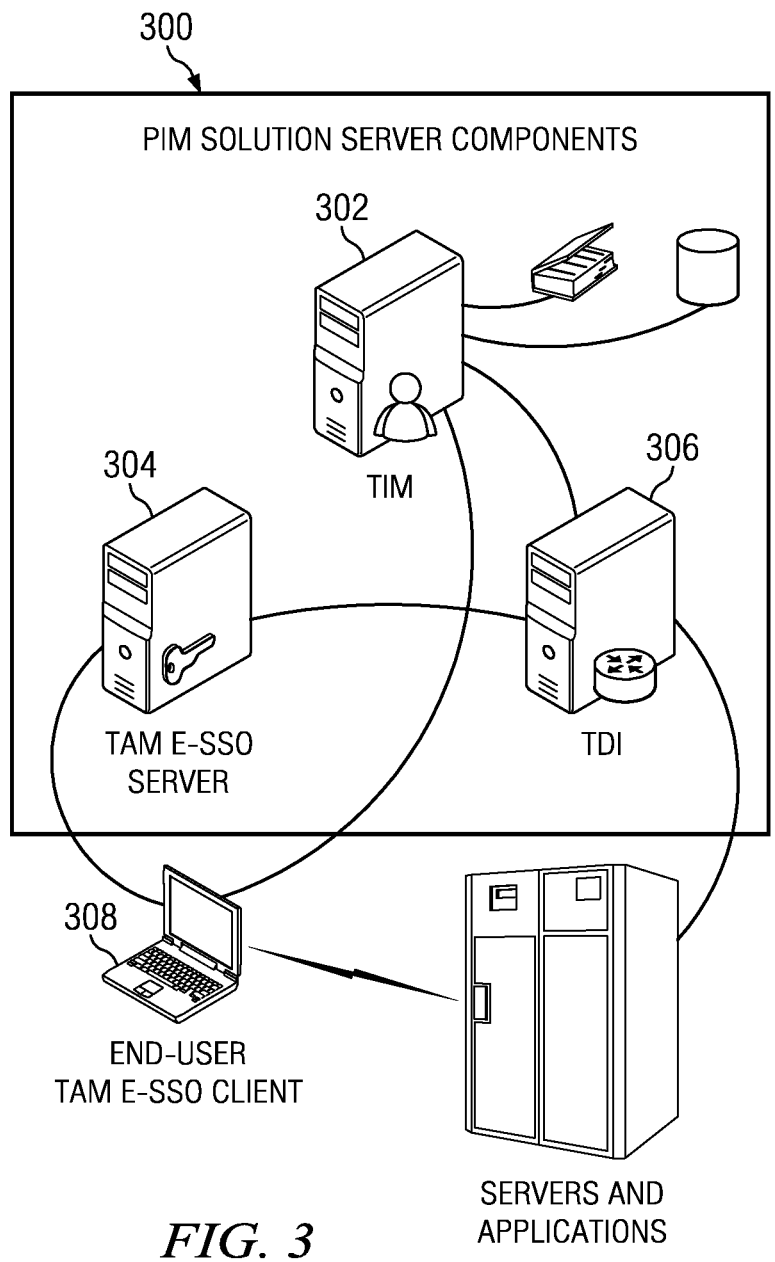
FIG. 3 illustrates a representative Privileged Identity Management (PIM) solution in which the disclosed subject matter may be implemented.

By way of further background, FIG. 3 illustrates a known Privileged Identity Management (PIM) solution in which the subject technique (described below) may be implemented. As is known in the art, the PIM solution may be used to manage privileged IDs, which are pre-built accounts that are associated with particular resources. These accounts are distinguished from general user IDs by assignment of security, administrative, or system authorities. They are typically known by their names: root, Administrator, sa, sec_master, db2admin, itim manager, wasadmin, and others. In the known approach, such accounts can be accessed only by specifying a privileged password. These accounts provide significant power to the user, as they allow a user to log on, and to have complete control of the target resource (e.g., system, machine, device, operating system, application, or the like) and full access to all information about that resource. The solution shown in FIG. 3 is merely representative of an operating environment, and it should be taken to limit the subject matter described herein. The representative PIM solution 300 comprises a set of core components including an identity manager 302, an access manager for enterprise single sign-on (E-SSO) 304, and an optional directory integrator 306. In a representative embodiment, the identity manager 302 is Tivoli® Identity Manager (TIM), the access manager is Tivoli Access Manager for Enterprise Single Sign-On (TAM E-SSO), and the directory integrator is Tivoli Directory Integrator (TDI). The solution provides for automated check-out and check-in of a privileged ID within the security context of an access profile that is being managed by the access manager. In the usual operation, the check-out is an exclusive check-out of an individual privileged account for the duration of its use by that user. When an application is closed, the access manager executes a check-in of the credentials back into the identity manager.

In operation, an organization defines privileged roles that are tied to appropriate system and account entitlements. The roles can also be tied to pools of accounts (for example, a pool of 15 database administrator accounts) when more than one user is expected to use a given privilege at the same time. When those roles are assigned to an employee, the solution 300 automatically provisions any personal accounts that the user is entitled to, and it also allows that employee the option of checking-out any entitled privileged IDs for a specified lease period. The Tivoli Access Manager for Enterprise Single Sign-On client 308 is leveraged to simplify privileged account access and provide automation for the user. When a user accesses a system where a privileged ID is required, the client 308 automatically checks-out the required account and inserts the credentials into the user's session. After finishing the tasks that required using the privileged account, the user can rely on an automatic check-in process to return the privileged user ID to the stack.

Generalizing, a PIM solution or system comprises hardware and software elements to facilitate the creation, administration and management of privileged identities.

Policy-Driven Approach to Manage Privileged/Shared Identity

With the above as background, the subject matter of this disclosure is now described. As noted, preferably the techniques may be implemented within or in association with a privilege identity management (PIM) system or solution such as described above in FIG. 3.

The term privileged IDs refers to the pre-built accounts that are managed according to a policy-driven approach according to this disclosure. As noted above, these accounts are distinguished from general user IDs (sometimes referred to herein as personal accounts) by assignment of security, administrative, or system authorities. A shared ID refers to a privileged ID that can be used by more than one individual. A privileged identity refers to any type of user or account that holds special or extra permissions. A privileged identity is a non-personal account.

Figure 4:
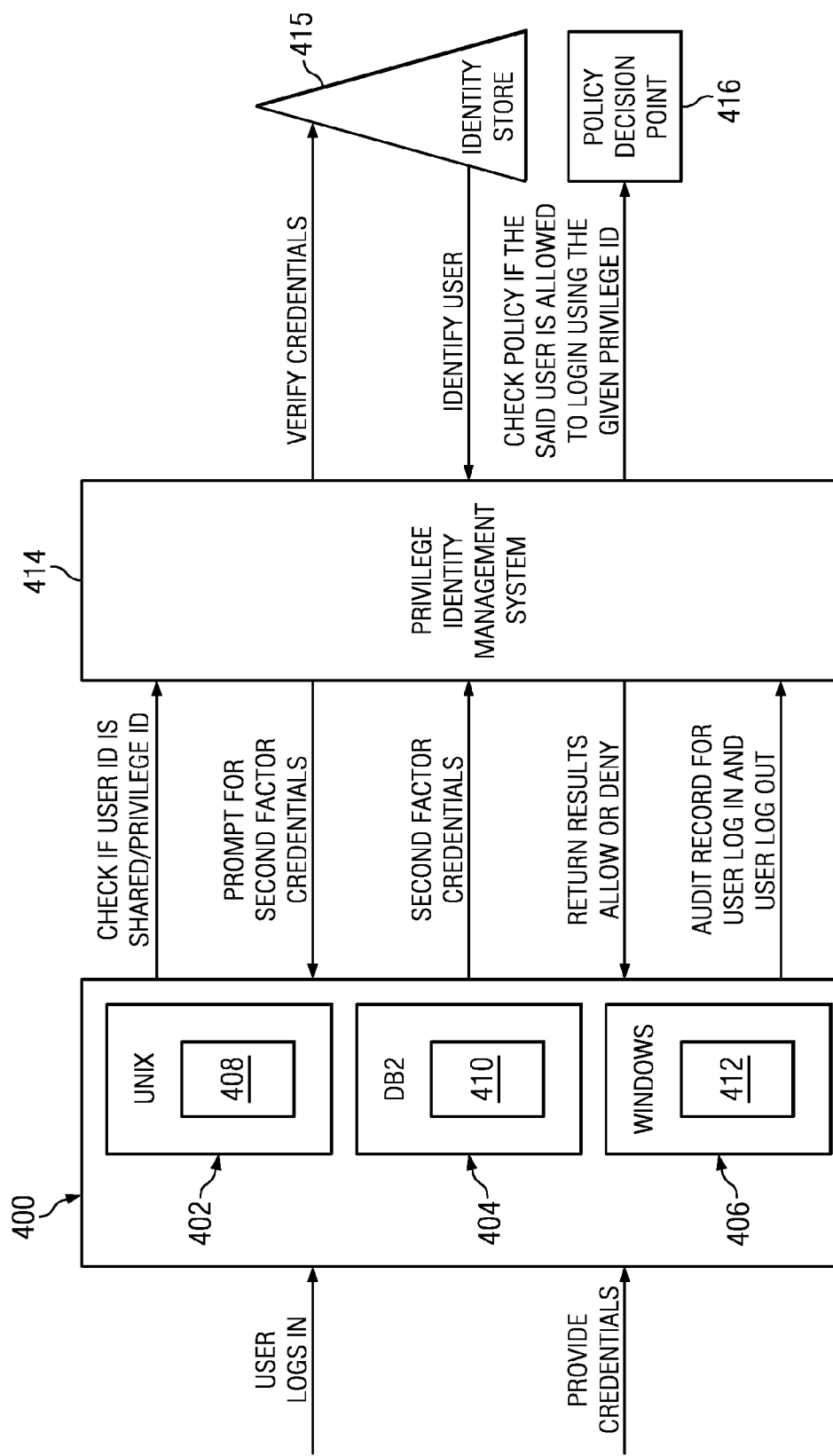
FIG. 4 illustrates how the technique for managing privileged identities is implemented with respect to a set of enterprise resources.

According to this disclosure, an entity (e.g., a user, an application associated with a user, an automated system, or the like) is first authenticated by the PIM system before it is entitled to use a privileged identity being managed by that system. FIG. 4 illustrates a preferred approach.

In this representative embodiment, the enterprise systems 400 comprise various types of computing resources, such as a Unix-based system 402, a DB2-based system 404, and a Windows-based system 406. Each particular computing resource has an associated authentication module associated therewith. Thus, in this representative example, authentication module 408 (e.g., a pluggable authentication module (PAM)) is associated with the Unix-based system 402, authentication module 410 (e.g., a DB2 security plug-in module) is associated with the DB2-based system 404, and authentication module 412 (e.g., a GINA module) is associated with the Windows-based system 406. In this example embodiment, the Privileged Identity Management (PIM) system 412 is associated with an identity store 415, and a policy decision point (PDP) 416. The identity store 415 may be a database associated with an identity manager (IM) or access manager (AM) solution such as has been described above. The policy decision point 416 is associated with a policy management system, such as described below in more detail.

Figure 5:
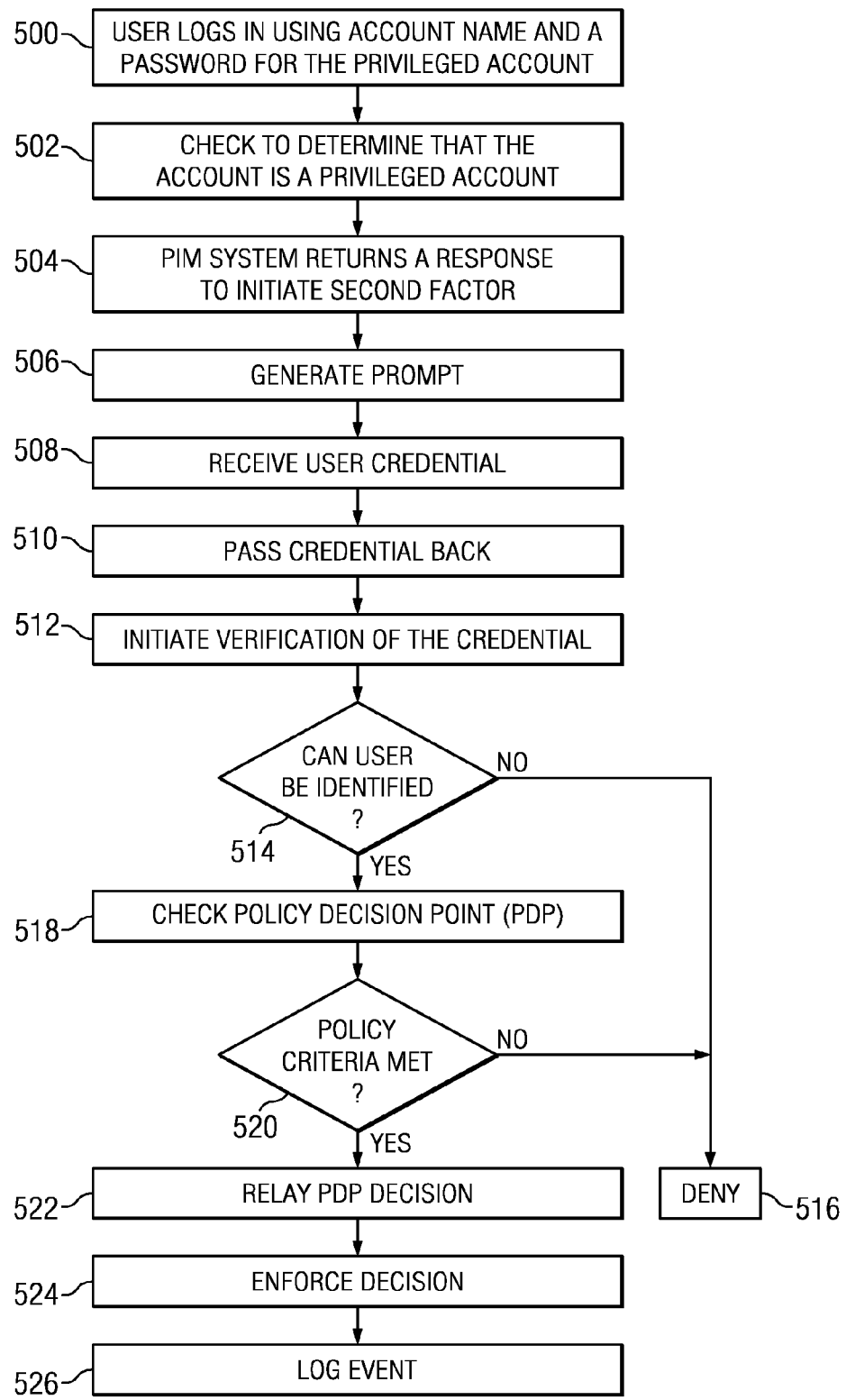
FIG. 5 illustrates a process flow of the inventive technique.

FIG. 5 is a process flow of the inventive technique. The process begins at step 500 when the user (or, more generally, an entity) logs in using the account name (e.g., root) and a password for the account. As noted above, the account is a privileged account, and the account name/password pair comprises a privileged account credential. While the privileged account credential is described here as an account name and password, this is not a limitation, as any credential type as described above (e.g., certificates, biometrics, smartcards, assertions, and the like) may be used. Depending on the type of resource involved, the associated authentication module then checks with the PIM system 412 to determine if the account is a privileged ID account. This is step 502. Thus, if the privileged account is Unix-based, step 502 is performed by the authentication module 408; if the privileged account is DB2-based, step 502 is performed by the authentication module 410, and so forth. At step 504, the PIM system 412 returns a response. This response is passed to the requesting user via the authentication module that provided the check request at step 502. Preferably, the response returned from the PIM system 412 causes the authentication module to generate and issue to the entity a prompt; the prompt, which is issued at step 506, requests the entity (seeking access to the account) for additional identifying information in the form of an entity-specific credential. In this embodiment, the additional identifying information thus is the second level of authentication, such that the approach gives rise to a two-factor authentication scheme. If the entity is a human being, the prompt is provided in the form of user interface window with a fill-in form; if the entity is a programmatic entity, the prompt is in the form of a request-response data exchange. For illustrative purposes, the entity is a human being and the additional identifying information is an intranet ID/user-specific password pair.

This is not a limitation, however, as the additional identifying information may be any credential used for authentication and identifying a user including, without limitation, certificates, biometrics, smartcards, assertions, and the like. At step 508, the entity provides the credential requested in connection with the two-factor authentication. The authentication module passes the credential back to the PIM at step 510. At step 512, the PIM system attempts to verify the credential against the identity store 414. A test is then performed at step 514 to determine if the user can be identified. If not, the routine branches to step 516, in which case access to the account is denied. If, however, the user can be identified, the routine continues at step 518 with the PIM system checking with the policy decision point 416. Step 518 in particular evaluates if the user (whose identity has now been verified) is allowed to login using the privileged identity. To this end, a test is then performed at step 520 to determine if the policy criteria established by the policy is met. If not, the routine branches back to step 516 and access is denied. If, however, the policy criteria is or are met, the routine continues to permit access. In particular, at step 522, the PDP decision is relayed back via the PIM system and the authentication module, which then enforces the decision at step 524. At step 526, the authentication module logs the event for future auditing. Although any convenient log event may be generated, preferably the event data captured includes the user's identity (as identified by the credential in the two factor authentication scheme, as well as one or more policy-based attributes).

Thus, according to the technique described herein, a second factor of authentication is used together with the privileged account credential (e.g., root/password) to identify the entity who is logging into the account using the privileged identity. This operation is coupled with a policy-driven approach to control usage of the privileged identity (which may be a shared identity) if the identified entity is allowed to login using the privileged identity credential. The policies can be quite varied, as implemented by known policy management systems. Thus, without limitation, the policy can use attributes of a user (e.g., designation/role), context information (such as location, time of day, originating IP address, or the like), combinations thereof, or the like to decide whether to grant or deny the requested account access. More generally, the policy enforces any generic access control including, without limitation, role-based access control, context-based access control, identity context-based access control, combinations thereof, and the like. The technique may be applied on a resource-specific basis, with a first policy applied to a first resource, a second policy distinct from the first policy applied to a second resource, and so forth. By overlaying a policy-driven approach with the use of two-factor authentication scheme in this manner, the particular account password can be shared by any number of users because access is permitted or denied based on a separate authentication. In addition, because the particular entity seeking access is first authenticated, the entity's identity (as well as the nature and scope of the access) is known with a degree of certainty that has heretofore not been possible with existing password scrambling schemes.

Figure 6:
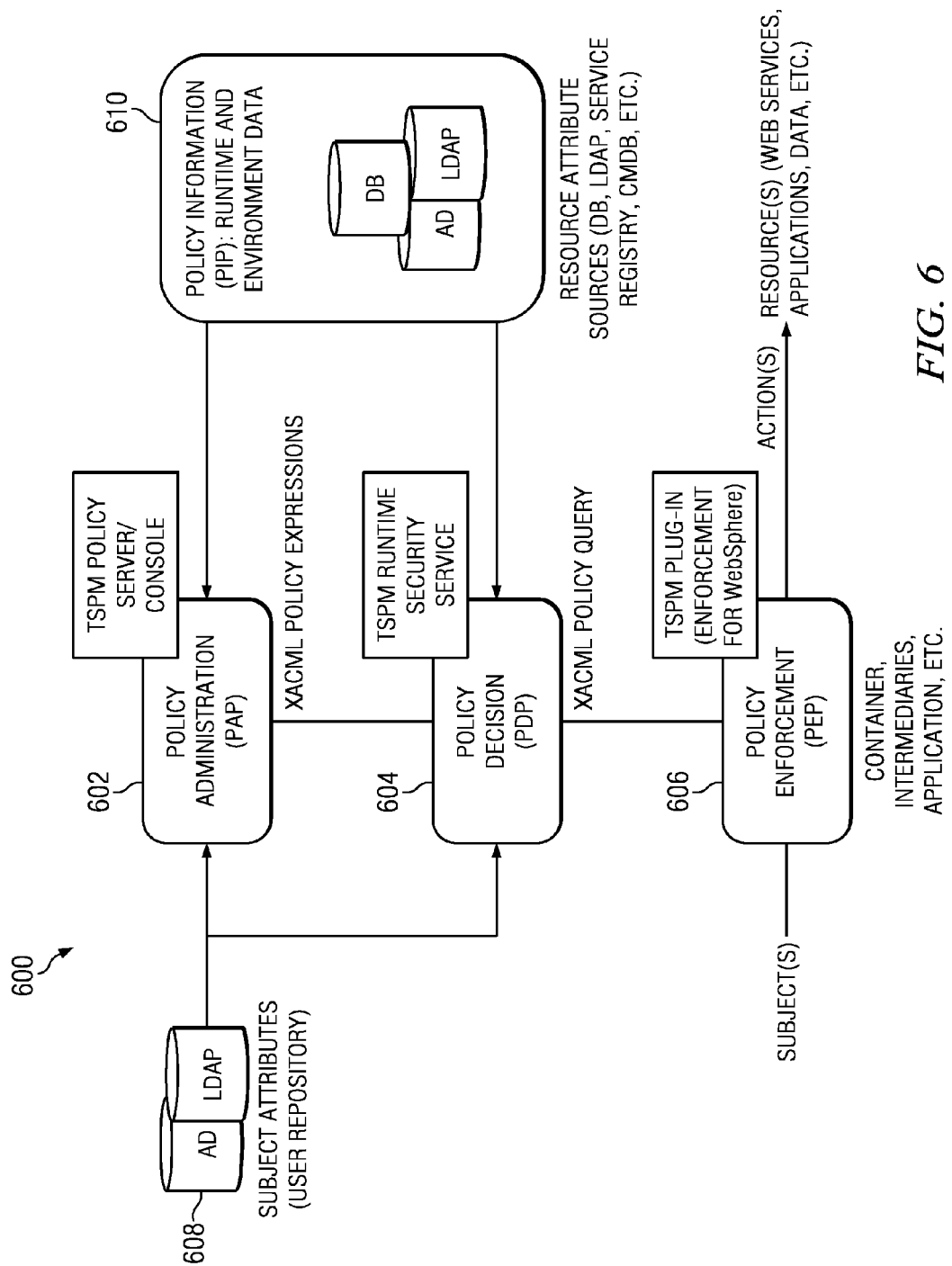
FIG. 6 illustrates a policy management system that may be used to facilitate the policy enforcement aspect of this disclosure.

FIG. 6 illustrates a representative policy management system 600 in which the above-described technique may be implemented or associated. The system 600 may be implemented across one or more machines operating in a computing environment, such as shown in FIG. 1. Typically, the system comprises a policy administration point (PAP) 602, the policy decision point (PDP) 604 as previously described, and a policy enforcement point (PEP) 606. Generally, the policy administration point 602 is used to define a policy, which may be specified as a set of XACML policy expressions. This policy uses subject attributes provided from a user repository 608, as well runtime and environment data received from policy information point (PIP) 610. The policy decision point (PDP) 604 receives similar information and responds to an XACML policy query received from the policy enforcement point (PEP) 606 to enforce the policy on a subject and with respect to a particular action initiated by the subject. In the embodiment previously described, the PDP 604 implements the policy decision, and the policy enforcement point is implemented within the particular authentication module, although this is not a limitation. In one commercial implementation of this approach, the PAP 602 is implemented by IBM® Tivoli® Security Policy Manager (TSPM) policy service/console, the PDP 604 is implemented in the TSPM runtime security service, and the PEP is implemented as a TSPM plug-in to application server, such as IBM WebSphere® Application Server.

The subject matter described herein has significant advantages over the prior art. As noted, the described technique provides a novel approach to control what entities are permitted to login using a privileged identity. The two factor authentication scheme ensures that only recognized (and authorized) users can use a privileged identity, and a further layer of control is provided by the policy enforcement to control if the identified user is allowed to login using the privileged identity credentials. A particular user might be identified but not permitted to access the account depending on the time of day, the origin of the access, and so forth. The particular policies involved are not a limitation of the disclosure, but these policies are enforced by one or more enforcement points in the system to provide for a robust and secure policy-driven approach to the management of privileged (included shared) identities within or across an enterprise. This approach obviates generation of special account passwords, the storing of such passwords, or the computational overhead associated therewith. In using this approach, the particular details of the account password may be shared or otherwise used without impacting the security of the scheme, which uses the second factor of authentication to control whether the user is identified (and thus authorized to be checked for policy conformance). By integrating the 2-factor authentication scheme, any particular policy enforcement may be applied to the privileged account. The particular policy determines which user can login on the particular resource.

In this approach, it is not required that the user have an account on the system itself. All that is required is a policy that allows the user login (e.g., as root) on the target resource.

A variant to the approach uses digital signatures (or one-time passwords) to distinguish between entities seeking to access the privileged account. In this approach application tier middleware in which the authentication module is associated may include an embedded module that cryptographically signs userid/password. An example of such an embedded module could be a custom jdbc driver wrapped around an original jdbc driver in the DB2-based embodiment. An enforcement operation may then be done by a proxy (or authentication agent) in front of the database, or by a custom security plug-in built into the database. For example, upon receiving an authentication request, the proxy/agent checks if the request is digitally signed. If the signature can be verified, then the proxy/agent has identified the requesting application and permits authentication to continue. If, however, the signature cannot be verified, then the proxy/agent checks with the PIM system to determine if the request is associated with a privileged identity. If so, the entity is prompted for the second factor authentication credentials, as previously described. This variant enables the system to distinguish between applications connecting to the database versus end users connecting to the system, as only the former will provide signed credentials that can be verified.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment. The PIM system or components thereof may be hosted in the cloud.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the group membership refresh functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the authentication module components are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

Further, the authentication functionality provided herein may be implemented as an adjunct or extension to an existing access manager or policy management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As used herein, a "client-side" application should be broadly construed to refer to an application, a page associated with that application, or some other resource or function invoked by a client-side request to the application. Further, while typically the client-server interactions occur using HTTP, this is not a limitation either. The client server interaction may be formatted to conform to the Simple Object Access Protocol (SOAP) and travel over HTTP (over the public Internet), FTP, or any other reliable transport mechanism (such as IBM® MQSeries® technologies and CORBA, for transport over an enterprise intranet) may be used. Any application or functionality described herein may be implemented as native code, by providing hooks into another application, by facilitating use of the mechanism as a plug-in, by linking to the mechanism, and the like.

The invention claimed is:

1. A method to manage privileged accounts associated with an enterprise, comprising:
   determining that an entity is attempting to logon to a privileged account that enables administrative control over a computing resource, wherein a privileged account is a non-personal account accessible using a shared privileged account credential;
   in response to determining that the entity is attempting to logon to the privileged account, initiating a second factor of authentication by prompting the entity to provide additional identifying information;
   determining, using software executing in a hardware element, that the entity is authorized to login to the privileged account by verifying the additional identifying information to identify the entity;

in response to determining that the entity is authorized to login to the privileged account, verifying, using an access control policy, that the entity that has been identified by verifying the additional identifying information also is allowed, per the access control policy, to logon to the privileged account using the shared privileged account credential;

providing the entity access to the privileged account when according to the access control policy the entity that has been identified by verifying the additional identifying information also is allowed to logon to the privileged account; and logging information about the entity access to the privileged account, the information logged identifying the entity based on the additional identifying information provided in response to the prompting.

2. The method as described in claim 1 wherein the determining that an entity is attempting to logon to a privileged account determines whether the entity is attempting to logon using the shared privileged account credential.

3. The method as described in claim 1 wherein the additional identifying information is a credential uniquely associated with the entity.

4. The method as described in claim 1 wherein the access control policy is one of: a role-based access control, a context-based access control, and an identity-context-based access control.

5. The method as described in claim 1 wherein the determining step verifies that information provided by the entity matches the shared privileged account credential associated with the privileged account.

6. The method as described in claim 1 further including denying the entity access to the privileged account when, based on the additional identifying information received following the prompt or information in the policy, the entity is not authorized to login to the privileged account.

7. The method as described in claim 1 wherein the entity is a user or an application associated with the entity.

8. The method as described in claim 1 wherein determining that an entity is attempting to logon to the privileged account further includes:
   determining whether a cryptographic signature associated with the logon can be verified, and
   if the cryptographic signature cannot be verified, prompting the entity to provide the additional identifying information.

9. The method as described in claim 8 wherein the entity is a programmatic entity.

10. Apparatus, comprising:
   a processor;
   computer memory holding computer program instructions executed by the processor to manage privileged accounts associated with an enterprise by:
      determining that an entity is attempting to logon to a privileged account that enables administrative control over a computing resource, wherein a privileged account is a non-personal account accessible using a shared privileged account credential;
      in response to determining that the entity is attempting to logon to the privileged account, initiating a second factor of authentication by prompting the entity to provide additional identifying information;
      determining that the entity is authorized to login to the privileged account by verifying the additional identifying information to identify the entity;
      in response to determining that the entity is authorized to login to the privileged account, verifying, using an access control policy, that the entity that has been identified by verifying the additional identifying information also is allowed, per the access control policy, to logon to the privileged account using the shared privileged account credential;
      providing the entity access to the privileged account when according to the access control policy the entity that has been identified by verifying the additional identifying information also is allowed to logon to the privileged account; and
      logging information about the entity access to the privileged account, the information logged identifying the entity based on the additional identifying information provided in response to the prompting.

11. The apparatus as described in claim 10 wherein the determining that an entity is attempting to logon to a privileged account determines whether the entity is attempting to logon using the shared privileged account credential.

12. The apparatus as described in claim 10 wherein the additional identifying information is a credential uniquely associated with the entity.

13. The apparatus as described in claim 10 wherein the access control policy is one of: a role-based access control, a context-based access control, and an identity context-based access control.

14. The apparatus as described in claim 10 wherein the determining step verifies that information provided by the entity matches the shared privileged account credential associated with the privileged account.

15. The apparatus as described in claim 10 wherein the computer program instructions are further executed to deny the entity access to the privileged account when, based on the additional identifying information received following the prompt or information in the policy, the entity is not authorized to login to the privileged account.

16. The apparatus as described in claim 10 wherein the entity is a user or an application associated with the entity.

17. A computer program product in a non-transitory computer readable medium for use in a data processing system, the computer program product holding computer program instructions which, when executed by the data processing system, manage privileged accounts associated with an enterprise the method comprising by:
   determining that an entity is attempting to logon to a privileged account that enables administrative control over a computing resource, wherein a privileged account is a non-personal account accessible using a shared privileged account credential;
   in response to determining that the entity is attempting to logon to the privileged account, initiating a second factor of authentication by prompting the entity to provide additional identifying information;
   determining that the entity is authorized to login to the privileged account by verifying the additional identifying information to identify the entity;
   in response to determining that the entity is authorized to login to the privileged account, verifying, using an access control policy, that the entity that has been identified by verifying the additional identifying information also is allowed, per the access control policy, to logon to the privileged account using the shared privileged account credential;
   providing the entity access to the privileged account when according to the access control policy the entity that has been identified by verifying the additional identifying information also is allowed to logon to the privileged account; and logging information about the entity access to the privileged account, the information logged identifying the entity based on the additional identifying information provided in response to the prompting.

18. The computer program product as described in claim 17 wherein the determining that an entity is attempting to logon to a privileged account determines whether the entity is attempting to logon using the shared privileged account credential.

19. The computer program product as described in claim 17 wherein the additional identifying information is a credential uniquely associated with the entity.

20. The computer program product as described in claim 17 wherein the access control policy is one of: a role-based access control, a context-based access control, and an identity context-based access control.

21. The computer program product as described in claim 17 wherein the determining step verifies that information provided by the entity matches the shared privileged account credential associated with the privileged account.

22. The computer program product as described in claim 17 wherein the computer program instructions are further executed to deny the entity access to the privileged account if, based on the additional identifying information received following the prompt or information in the policy, the entity is not authorized to login to the privileged account.

23. The computer program product as described in claim 17 wherein the entity is a user or an application associated with the entity.

* * * * *